United States Patent Office 3,116,337
Patented Dec. 31, 1963

3,116,337
PROCESS FOR THE PREPARATION OF
FLUORINATED OLEFINS
Murray Hauptschein, Glenside, and Milton Braid, Philadelphia, Pa., assignors to Pennsalt Chemicals Corporation, Philadelphia, Pa., a corporation of Pennsylvania
No Drawing. Filed Sept. 6, 1960, Ser. No. 53,878
11 Claims. (Cl. 260—653.5)

This invention relates to the preparation of fluorinated, terminally unsaturated olefins by the dehydroiodination of compounds containing a terminal —$CH_2CF_2I$ group.

It is well known that strong bases such as aqueous or alcoholic KOH may be employed to carry out dehydrohalogenation reactions. It has been found, however, that when such a reagent is used to dehydroiodinate compounds containing a —$CH_2CF_2I$ terminal group to produce terminally unsaturated olefins containing the group —$CH=CF_2$, the desired olefin is obtained in relatively poor yields and conversions. While the desired dehydroiodination occurs to some extent, the reaction is complicated by side reactions such, for example, as dehydrofluorination reactions and intermolecular rearrangements.

In accordance with the invention, it has been unexpectedly found that certain iodides containing the —$CH_2CF_2I$ terminal group may be dehydroiodinated under relatively mild conditions to produce olefins having the —$CH=CF_2$ group in high yields and conversions by reacting such iodides with an ionic fluoride, chloride or bromide in a liquid medium in which the ionic compound is at least partially soluble. In this reaction, it is believed that a halide ion (i.e. a fluoride, chloride or bromide ion) is the attacking reagent producing hydrogen halide as a byproduct as indicated by the following:

$$—CH_2CF_2I + X^- \rightarrow —CH=CF_2 + HX + I^-$$

where $X^-$ is $F^-$, $Cl^-$ or $Br^-$.

The reaction is applicable generally to compounds of the formula

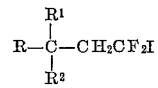

to produce olefins of the formula

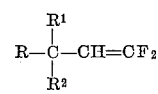

where R may be hydrogen, fluorine, chlorine, or a monovalent organic radical, and where $R^1$ and $R^2$ may be fluorine, a perfluoroalkyl radical or a perfluorochloroalkyl radical preferably containing from 1 to 10 and most desirably from 1 to 4 carbon atoms. When R is an organic radical, the nature of the radical is not important. Thus, R may be an alkyl, aryl, aralkyl, or heterocyclic radical. It may contain various substituents such as halogen, nitro, mercapto, carboxyl, hydroxy, amino, cyano, sulfoxy, etc.

A preferred class of starting iodides are those in which R is fluorine or an alkyl radical, particularly a fluorinated alkyl radical especially those selected from the class consisting of perfluoroalkyl, perfluorohydroalkyl, perfluorochloroalkyl, and perfluorochlorohydroalkyl radicals. As used herein, the term perfluoroalkyl means an alkyl radical containing only fluorine and carbon. A perfluorohydroalkyl radical is one containing only fluorine, hydrogen and carbon in which the molar ratio of fluorine to hydrogen is at least 1:1. A perfluorochloroalkyl radical is one containing only fluorine, chlorine and carbon in which the molar ratio of fluorine to chlorine is at least 1:1. A perfluorochlorohydroalkyl radical is one containing only fluorine, chlorine, hydrogen and carbon and in which the molar ratio of fluorine to chlorine plus hydrogen is at least 1:1.

When R is an organic radical, the number of carbon atoms it contains is not critical. Generally, however, the chain length of R will range from 1 to about 50 carbon atoms and preferably from 1 to about 30 carbon atoms.

Typical starting iodides and the corresponding olefins that are obtained are shown in the table below:

TABLE I

| Starting Iodide | Corresponding Olefin |
|---|---|
| $CF_3CH_2CF_2I$ | $CF_3CH=CF_2$ |
| $CF_3CF_2CF_2CH_2CF_2I$ | $CF_3CF_2CF_2CH=CF_2$ |
| $CF_3CH_2CF_2CH_2CF_2I$ | $CF_3CH_2CF_2CH=CF_2$ |
| $CF_3CH_2CF_2CH_2CF_2CH_2CF_2I$ | $CF_3CH_2CF_2CH_2CF_2CH=CF_2$ |
| $C_3F_7CH_2CF_2CH_2CF_2CH_2CF_2I$ | $C_3F_7CH_2CF_2CH_2CF_2CH=CF_2$ |
| $C_3F_7(CH_2CF_2)_3CH_2CF_2CH_2CF_2I$ | $C_3F_7(CH_2CF_2)_3CH_2CF_2CH=CF_2$ |
| $C_2F_5\overset{CF_3}{\underset{F}{C}}—CH_2CF_2I$ | $C_2F_5\overset{CF_3}{\underset{F}{C}}—CH=CF_2$ |
| $C_4F_9\overset{CF_3}{\underset{F}{C}}—CH_2CF_2I$ | $C_4F_9\overset{CF_3}{\underset{F}{C}}—CH=CF_2$ |
| $CF_3\overset{CF_2Cl}{\underset{F}{C}}—CH_2CF_2I$ | $CF_3\overset{CF_2Cl}{\underset{F}{C}}—CH=CF_2$ |
| $CF_2Br\overset{CF_3}{\underset{F}{C}}—CH_2CF_2I$ | $CF_2Br\overset{CF_3}{\underset{F}{C}}—CH=CF_2$ |
| $CF_2ClCFClCH_2CF_2I$ | $CF_2ClCFCl CH=CF_2$ |
| $C_3F_7CF_2\overset{CF_3}{C}FCF_2\overset{CF_3}{C}F—CH_2CF_2I$ | $C_3F_7CF_2\overset{CF_3}{C}FCF_2\overset{CF_3}{C}F—CH=CF_2$ |

TABLE I—Continued

| Starting Iodide | Corresponding Olefin |
|---|---|
| C₆H₅—CF₂CH₂CF₂I | C₆H₅—CF₂CH=CF₂ |
| Cl—C₆H₄—CHFCF₂CH₂CF₂I | Cl—C₆H₄—CHFCF₂CH=CF₂ |
| C₆H₅—CH₂CF₂CH₂CF₂I | C₆H₅—CH₂CF₂CH=CF₂ |
| CH₂ClCF₂CF₂CH₂CF₂I | CH₂ClCF₂CF₂CH=CF₂ |
| CH₃CF₂CF₂CH₂CF₂I | CH₃CF₂CF₂CH=CF₂ |
| ONCF₂CF₂CF₂CH₂CF₂I | ONCF₂CF₂CF₂CH=CF₂ |
| NO₂CH₂CF₂CF₂CH₂CF₂I | NO₂CH₂CF₂CF₂CH=CF₂ |
| C₆H₅—C(F)(CF₂Cl)—CH₂CF₂I | C₆H₅—C(F)(CF₂Cl)—CH=CF₂ |
| cyclopentyl—CF₂CH₂CF₂I | cyclopentyl—CF₂CH=CF₂ |

Starting iodides of the above type may be prepared by reacting an iodide of the general type $$R-\underset{R^2}{\underset{|}{\overset{R^1}{\overset{|}{C}}}}-I$$

with vinylidene fluoride (CF$_2$=CF$_2$) to produce compounds of the formula $$R-\underset{R^2}{\underset{|}{\overset{R^1}{\overset{|}{C}}}}-(CH_2CF_2)_nI$$

where R, R¹ and R² are as above defined and where $n$ is an integer ranging from 1 to about 20, which indicates the number of vinylidene fluoride (CH$_2$CF$_2$) units linked together in a straight chain in the molecule. This type of reaction is described in detail in the copending application of Hauptschein et al., Serial No. 773,551, filed November 13, 1958, now United States Patent 2,975,220, issued March 14, 1961. As described in that application, the reaction (usually referred to as telomerization) is preferably carried out by heating the iodide and vinylidene fluoride at temperatures ranging from about 120° C.–350° C. and preferably from about 140° C.–250° C. preferably under superatmospheric pressures. The value of $n$ may be controlled by varying the ratio of CH$_2$=CF$_2$ to iodide. In general, the higher this ratio, the higher will be the value of $n$.

The ionic halides which may be employed to effect the dehydroiodination reactions of the invention comprise generally inorganic or organic fluorides, chlorides, or bromides which are ionic in nature, i.e., capable of producing a free fluoride, chloride or bromide ion in solution. The inorganic ionic fluorides, chlorides and bromides are preferred, particularly the water soluble alkali metal and alkaline earth metal compounds of this type. However, ionic organic halides such as quaternary ammonium halides, e.g. tetramethylammonium fluoride, tetramethylammonium bromide; methyl pyridinium chloride; tetraethylammonium fluoride, etc., may be used, as well as amine hydrochlorides such as trimethylamine hydrochloride, triethylamine hydrochloride, methylamine hydrochloride, ethylamine hydrochloride, dimethylamine hydrochloride, etc.

Particularly preferred ionic halides for the dehydroiodination reaction of the invention are the chlorides and fluorides of lithium, sodium and potassium. The chlorides have the advantage of lower cost. Lithium chloride is particularly advantageous since it is soluble in a number of organic solvents in which the reactant iodides are also soluble. This has the advantage of providing a one-phase homogeneous reaction medium.

The reaction is carried out in a liquid medium in which the ionic halide is at least partially soluble at the reaction temperature employed. The solubility of the ionic halide should generally be such that the reaction solution has a normality based upon halide ion of at least about 0.01 and preferably of at least about 0.5. Preferably, the liquid medium is an organic solvent in which both the ionic halide and the reactant iodide are soluble to some extent. The solubility of both reactants in the reaction medium results generally in faster reactions and increased conversions. Polar organic solvents are preferred including for example, amides such as dimethyl formamide, acetamide, dimethylacetamide, nitriles such as acetonitrile; polar heterocyclic solvents such as tetrahydrofuran and tetrahydropyran; sulfoxides such as dimethyl sulfoxide, sulfones such as dimethyl sulfone, and methylethyl sulfone; ketones such as methylethyl ketone and methylisobutyl ketone; alcohols such as amyl alcohol, hexyl alcohol, and ethylene glycol; ethers such as dioxane and polyethers such as CH$_3$OCH$_2$CH$_2$OCH$_3$; and hydroxy ethers such as ethylene glycol monoethyl ether.

While the reaction temperature chosen will depend upon the particular combination of iodide, ionic halide and liquid medium, the reaction is generally carried out at temperatures ranging from about 20° C. to about 250° C. In most cases optimum reaction temperatures will lie in the range from about 50° C. to about 175° C. As to the lower temperature, the limiting factor is generally reaction rate and in some cases the solubility of the ionic halide in the liquid medium. To obtain practicable reaction rates, moderate heating of the reaction mixture is usually required. With respect to higher temperatures, the limiting factor is the occurrence of side reactions, such as dehydrofluorination, which decrease the yield of the desired olefin.

For good conversions the molar ratio of ionic halide to iodide should be at least 1:1 (the stoichiometric ratio) and preferably a slight to moderate molar excess of ionic halide is used, e.g. molar ratios of ionic halide to iodide of 1:1.1 to 3:1.

Reaction time is not critical. Since reaction rates are proportional to the temperature employed, longer reaction periods to obtain good conversions are required at lower temperatures. In most cases reaction periods of ½ hour to about 5 hours will be found satisfactory.

Hydrogen halide is formed as a by-product of the reaction, and there may be tendency for the hydrogen halide to add across the double bond formed by the dehydroiodination to produce saturated by-products. Thus, when the reaction is carried out using lithium chloride in dimethyl formamide, HCl liberated as a by-product is retained in the dimethyl formamide and if the olefin remains in solution, there is a tendency for HCl to add across the double bond. This may be avoided, however, by distilling out the olefin as it is formed thus removing it from the reaction zone. In the case of the lower molecular weight olefins, distillation of the olefin may occur satisfactorily at atmospheric pressures. In the case of higher olefins, however, it may be desirable to carry out the reaction under a vacuum in order to distill out the product olefin before it has an opportunity to react with the by-product hydrogen halide. If, because of the relatively high boiling point of the product olefin, it is difficult to remove from the reaction zone by distillation, it may be desirable to add a weak base such as sodium bicarbonate or other reagent that will combine with the hydrogen halide as formed and thus prevent it from adding across the double bond of the product olefin.

The crude product olefin may be purified according to conventional techniques. It may, for example, when a water soluble reaction medium is employed, be water-washed or steamed distilled to remove solvent and then fractionally distilled to further purify it.

The following examples are intended to illustrate the invention.

*Example 1*

To a round-bottom flask equipped with a distillation column and stirrer there is introduced 4.2 grams of lithium chloride and 15 milliliters of dimethyl formamide. To this mixture there is added 10 grams of iodides consisting 95 percent of iodides of the formula $CF_3CF_2CF_2CH_2CF_2I$ and 5 percent of iodides of the formula $$CF_3CF_2CF_2CF_2CH_2I$$

The mixture is heated with stirring while the temperature is gradually raised from 30° C. to 155° C. over a total period of 2 hours, and a colorless distillate is collected in the receiver having a boiling point of 36° to 37° C. The distillate is washed with water, dried over anhydrous magnesium sulfate, and redistilled to give 4.6 grams (71% yield) of 2-hydroperfluoropentene-1

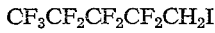
$$CF_3CF_2CF_2CH=CF_2$$

boiling at 37° C. shown by vapor fractometry to be of 99 percent purity, the infrared spectrum of which shows a strong peak at 5.70μ characteristic of the —C=C— stretching vibration. *Analysis.*—Calculated for: $C_5HF_9$: C, 25.88; H, 0.44. Found: C, 25.47; H, 0.54.

Water is added to the reaction residue which remains undistilled in the flask, and the unreacted water insoluble iodide is recovered and analyzed by vapor-liquid chromatography and shown to consist of 86 percent of

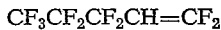
$$CF_3CF_2CF_2CH_2CF_2I$$

and 14 percent of $CF_3CF_2CF_2CF_2CH_2I$. The increase in the proportion of iodide in the reaction residue terminating in a —$CH_2I$ group results from the fact that dehydroiodination of this latter end group does not take place, the dehydroiodination apparently being confined to iodides terminating in a —$CF_2I$ group.

*Example 2*

A mixture of 36 grams (0.1 mole) of the iodide $CF_3CF_2CF_2CH_2CF_2I$ and 6.3 grams (0.15 mole) of lithium chloride and 50 milliliters of dimethyl formamide is placed in a 250 milliliter flask equipped with a stirrer, thermometer well and short distillation column leading directly to a trap cooled to −78° C. The reaction temperature is gradually raised to 155° C. over a period of 2 hours and then held at this temperature for 30 minutes.

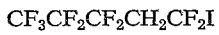

Shortly after heating is started (50 to 60° C.) the reaction mixture became a dark, reddish-brown color, and at 100° C. distillation of olefin from the mixture is evident. When the distillation of the olefin from the reaction mixture is complete the deep color reverts to pale yellow. The product collected in the cold trap is washed with sodium carbonate solution, dried over anhydrous magnesium sulfate and distilled. The olefin

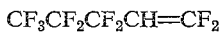
$$CF_3CF_2CF_2CH=CF_2$$

is obtained in 91% yield (21 grams) as a colorless liquid, boiling at 37° C., the infrared spectrum of which shows a strong peak at 5.70μ characteristic of the C=C stretching vibration in a $CH=CF_2$ group. This compound is shown to be 99 mole percent pure by vapor liquid partition chromatography.

*Example 3*

A mixture of 8.4 grams (0.025 mole)

$$CF_3CF_2CF_2CH_2CF_2I$$

4.2 grams (0.1 mole) of lithium chloride and 15 milliliters of dimethyl sulfoxide is placed in a small round bottom flask equipped with a stirrer, thermometer well, and small distillation column. The mixture is gradually heated with stirring from room temperature to about 100 to 110° C. pot temperature whereupon a colorless product distills over. The product is washed with water, dried over magnesium sulfate and analyzed by vapor liquid partition chromatography. A yield of approximately 90% of the olefin $CF_3CF_2CF_2CH=CF_2$ is obtained.

*Example 4*

Using the same general procedure described in previous examples, a mixture of $CF_3CF_2CF_2CH_2CF_2I$ and sodium bromide (molar ratio 1:1.5) together with 50 milliliters of dimethyl formamide are heated with stirring to a temperature of 100° C. The same olefin

$$CF_3CF_2CF_2CH=CF_2$$

is obtained in good yield with no evidence of any side reactions.

*Example 5*

Using the procedures described in the previous examples, a mixture of the iodide $CF_3CF_2CF_2CH_2CF_2I$ and potassium fluoride (molar ratio 1:1.5) together with 50 milliliters of dimethyl formamide is heated gradually to 100° C. The same olefin as in the previous examples $CF_3CF_2CF_2CH=CF_2$ is produced in good yield.

*Example 6*

Using the same procedures and equipment as in previous examples, a mixture of 62 grams (0.24 mole) of the iodide $CF_3CH_2CF_2I$, 21 grams (0.5 mole) of lithium chloride and 100 milliliters of dimethyl formamide is gradually heated with stirring from room temperature to 150° C. Approximately 30 grams (94% yield) of the olefin $CF_3CH=CF_2$ is collected having a boiling point of −20° C., the infrared spectrum of which shows a strong peak at 5.68 microns.

*Example 7*

Using the same equipment and procedures as on the previous examples, a mixture of 30 grams (0.07 mole) of the iodide $CF_3CF_2CF_2(CH_2CF_2)_2I$, 6 grams (0.14 mole) of lithium chloride and 30 milliliters of dimethyl formamide is heated with stirring from room temperature to 155° C. over a period of 2 hours. Distillation of the product olefin is evident at 90° to 100° C. The reaction mixture turns a dark red during the reaction, the color becoming a light yellow at the end. There is obtained 18.5 grams (90% yield) of the olefin

$$CF_3CF_2CF_2CH_2CF_2CH=CF_2$$

having a boiling point of 93 to 94° C. *Analysis.*—Calculated for: $C_7H_3F_{11}$: C, 28.4; H, 1.02. Found: C, 28.8; H, 1.10.

Example 8

A mixture of 97.6 grams (0.2 mole) of the iodide $CF_3CF_2CF_2(CH_2CF_2)_3I$, 12.6 grams (0.3 mole) of lithium chloride and 100 milliliters of dimethyl formamide is heated with stirring at 150° C. for 3 hours. The mixture is then poured into a liter of water and steam distilled. A water-insoluble oil separates and is washed with a dilute sodium bisulfite solution and then dried over anhydrous magnesium sulfate to provide 64.5 grams (90% yield) of a pale yellow oil consisting mostly of the olefin $CF_3CF_2CF_2(CH_2CF_2)_2CH=CF_2$ boiling at about 65° at 35 mm. Hg.

Example 9

130 grams of a mixture of telomer iodides of the formula $CF_3CF_2CF_2(CH_2CF_2)_nI$, where $n$ ranges from about 1 to 4, is mixed with 21 grams of lithium chloride and 150 milliliters of dimethyl formamide and the mixture placed in a flask equipped with a stirrer and small distillation column. The reaction mixture is heated gradually from room temperature to 155° C. and an overhead distillate is collected. When no further product distills over at 155° C. the reaction mixture in the flask is poured into water and steam distilled.

The overhead distillate from this reaction is washed with water and dried over anhydrous magnesium sulfate and then redistilled to separate the following fractions:

(a) The olefin $CF_3CF_2CF_2CH=CF_2$ as a fraction boiling at 37° C. and (b) The olefin $CF_3CF_2CF_2CH_2CF_2CH=CF_2$ as a fraction boiling at approximately 93° C.

The residue from this redistillation and the steam distillate recovered from the reaction mixture are combined and separated by distillation into the following fractions:

(c) A fraction boiling at approximately 65° C. at 35 mm. Hg consisting essentially of the olefin $$CF_3CF_2CF_2(CH_2CF_2)_2CH=CF_2$$

(d) A residue boiling at approximately 70° C. at 10 mm. Hg. consisting mostly of the olefin $$CF_3CF_2CF_2(CH_2CF_2)_3CH=CF_2$$

Example 10

A mixture of 52 grams (0.16 mole) of the iodide $CF_3(CH_2CF_2)_2I$, 10 grams (0.24 mole) of lithium chloride and 75 milliliters of dimethyl formamide is placed in a flask equipped with a distillation column, stirrer and thermometer well. While applying a slight vacuum to this system, the mixture is heated with stirring gradually from room temperature to 150° C. The product begins to distill over at 30 to 40° C. and condenses in a Dry-Ice cooled trap. The product is washed with water and dried over anhydrous magnesium sulfate. 28 grams (89% yield) of the olefin $CF_3CH_2CF_2CH=CF_2$ is obtained boiling at 58° C. *Analysis.*—Calculated for: $C_5H_3F_7$: C, 30.63; H, 1.54. Found: C, 30.92; H, 1.68. The infrared spectrum of this product shows a strong peak at 5.69μ in the vapor phase.

Example 11

Using the same equipment as described in the previous examples, a mixture of 96 grams (0.25 mole) of the iodide $CF_3(CF_2CF_2)_2I$, 21 grams (0.5 mole) of lithium chloride and 150 milliliters of dimethyl formamide is heated with stirring from room temperature to 160° C. over a period of 2.5 hours. Distillation of the product occurs mostly at 100° to 130° C. From this reaction there is obtained 15 grams (30% yield) of the olefin $CF_3(CH_2CF_2)_2CH=CF_2$ boiling at 120° C. *Analysis.*—Calculated for: $C_7H_5F_9$: C, 32.3; H, 1.94; F, 65.7. Found: C, 32.3; H, 2.13; F, 65.6.

There is also obtained from this reaction approximately 50% conversion of the starting iodide to the chloride: $CF_3(CH_2CF_2)_3Cl$ apparently formed by addition of the product hydrogen chloride to the olefin.

Example 12

Example 11 is repeated under the same conditions except that the reaction is carried out under reduced pressure causing the product olefin to distill off more rapidly at a lower temperature. This results in an increased yield of the olefin and a decreased yield of the by-product chloride.

Example 13

Using the same procedures and equipment as described in the previous example a mixture of the iodide

and lithium chloride (molar ratio of LiCl:iodide of 1.5:1) in dimethyl formamide is heated with stirring to a temperature of 150° C. There is obtained from this reaction a good yield of the olefin

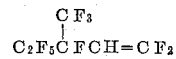

Example 14

Using the procedure previously described, a mixture of the iodide

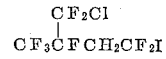

and lithium fluoride (molar ratio LiF:iodide of 2:1) in dimethyl sulfone is heated with stirring to a temperature of 150° C. The product olefin

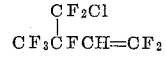

distills over and is recovered in good yield.

Example 15

Using the procedure previously described, a mixture of the iodide $CF_2ClCFClCH_2CF_2I$ and lithium chloride (molar ratio of LiCl:iodide of 1.5:1) in dimethyl formamide is heated gradually with stirring to a temperature of 150° C. over a period of two hours. The olefin $CF_2ClCFClCH=CF_2$ is recovered in good yield.

The fluorinated terminally unsaturated olefins of the invention are useful as intermediates for the preparation of many valuable compounds. By oxidation at the double bond, for example, in the presence of an aqueous potassium permanganate solution, fluorinated carboxylic acids may be produced having one less carbon than the corresponding olefin of the following type:

where R, $R^1$ and $R^2$ are as previously defined. Such acids, and their water soluble derivative, such as their alkali metal salts, particularly where R is a fluorinated alkyl radical and where the number of carbon atoms in the molecule is five or more, have valuable surface active properties which are greatly enhanced by the fluorine atoms which they contain.

The novel fluorinated olefins of the invention are also useful as intermediates for the preparation of new fluorinated nitroalcohols of the general formula

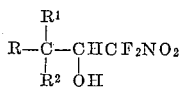

These nitroalcohols are prepared by the addition of dinitrogen tetroxide to fluorinated olefins prepared in accordance with this invention. Such fluorinated nitroalcohols are useful as thermally stable lubricants, hydraulic fluids and heat transfer fluids. They are unusually stable to acids, showing no decomposition when heated to boiling with concentrated sulfuric acid.

The fluorinated olefins of the invention are also useful as comonomers for copolymerization with other olefins, particularly fluorinated olefins such as vinylidene fluoride, tetrafluoroethylene, fluorinated butadienes and fluorinated styrenes to give in many cases elastomeric resins of good chemical stability.

This application is a continuation-in-part of the prior copending application Serial No. 773,551, filed November 13, 1958, of Murray Hauptschein et al., now United States Patent 2,975,220, issued March 14, 1961.

We claim:

1. A method for producing olefins containing a terminal —CH=CF$_2$ group by the selective dehydroiodination of an iodide of the formula:

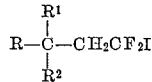

where R is selected from the class consisting of hydrogen, fluorine, chlorine and monovalent organic radicals and where R$^1$ and R$^2$ are selected from the class consisting of fluorine, perfluoroalkyl and perfluorochloroalkyl radicals, said method comprising the step of reacting said iodide with an ionic halide selected from the class consisting of the water soluble alkali metal and alkaline earth metal fluorides, chlorides and bromides, said reaction being carried out in a liquid medium in which said halide is at least partially soluble under the reaction conditions.

2. A method in accordance with claim 1 in which said reaction is carried out at a temperature of from about 20° C. to about 250° C.

3. A method in accordance with claim 1 in which said ionic halide is selected from the class consisting of the chlorides and fluorides of lithium, sodium and potassium.

4. A method in accordance with claim 1 in which said ionic halide is lithium chloride.

5. A method in accordance with claim 1 in which said liquid medium is a polar organic solvent.

6. A method for producing olefins containing a terminal —CH=CF$_2$ group by the selective dehydroiodination of an iodide of the formula:

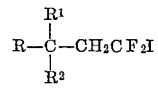

where R is selected from the class consisting of hydrogen, fluorine, chlorine and monovalent organic radicals and where R$^1$ and R$^2$ are selected from the class consisting of fluorine; perfluoroalkyl and perfluorochloroalkyl radicals, said method comprising the step of reacting said iodide with an ionic halide selected from the class consisting of the chlorides and fluorides of lithium, potassium and sodium, said reaction being carried out at a temperature of from about 20° C. to about 250° C. in a liquid medium in which said halide is at least partially soluble under reaction conditions.

7. A method in accordance with claim 6 in which said reaction is carried out a temperature of from about 50° C. to about 175° C.

8. A method for producing olefins containing a terminal —CH=CF$_2$ group by the selective dehydroiodination of an iodide of the formula:

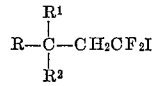

where R is a fluorinated alkyl radical and where R$^1$ and R$^2$ are selected from the class consisting of fluorine, perfluoroalkyl and perfluorochloroalkyl radicals, said method comprising the step of reacting said iodide with an ionic halide selected from the class consisting of the chlorides and fluorides of lithium, potassium and sodium, said reaction being carried out at a temperature of from about 20° C. to about 250° C. in a polar organic solvent in which said halide is at least partially soluble under reaction conditions.

9. A method for producing olefins containing a terminal —CH=CF$_2$ group by the selective dehydroiodination of an iodide of the formula:

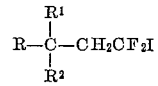

where R is a fluorinated alkyl radical and where R$^1$ and R$^2$ are selected from the class consisting of fluorine, perfluoroalkyl and perfluorochloroalkyl radicals, said method comprising the step of reacting said iodide with lithium chloride, said reaction being carried out at a temperature from about 50° C. to about 175° C. in a polar organic solvent in which lithium chloride is at least partially soluble under reaction conditions.

10. A method in accordance with claim 9 in which said polar organic solvent is dimethyl formamide.

11. A method in accordance with claim 9 in which said polar organic solvent is dimethyl sulfoxide.

References Cited in the file of this patent

UNITED STATES PATENTS

| | | |
|---|---|---|
| 2,879,310 | Eby | Mar. 24, 1959 |
| 2,879,311 | Hawkins | Mar. 24, 1959 |
| 2,880,247 | Miller | Mar. 31, 1959 |

FOREIGN PATENTS

| | | |
|---|---|---|
| 619,394 | Great Britain | Mar. 8, 1949 |
| 723,715 | Great Britain | Feb. 9, 1955 |

OTHER REFERENCES

Lovelace: Aliphatic Flourine Compounds, Reinhold Pub. Co. (1958), pp. 101–104.